US006336143B1

United States Patent
Diedrich et al.

(10) Patent No.: US 6,336,143 B1
(45) Date of Patent: Jan. 1, 2002

(54) METHOD AND APPARATUS FOR MULTIMEDIA DATA INTERCHANGE WITH PACING CAPABILITY IN A DISTRIBUTED DATA PROCESSING SYSTEM

(75) Inventors: Richard Alan Diedrich; Harvey Gene Kiel, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/127,932

(22) Filed: Sep. 27, 1993

(51) Int. Cl.$^7$ .................. G06F 13/38; G06F 15/177
(52) U.S. Cl. .................. 709/231; 709/219; 709/234
(58) Field of Search ................. 395/800, 200, 395/600; 364/200; 370/94, 94.1; 709/231, 219, 234

(56) References Cited

U.S. PATENT DOCUMENTS

| 4,208,714 A | | 6/1980 | Eklund et al. |
| 4,771,391 A | | 9/1988 | Blasbalg ..................... 364/514 |
| 5,040,176 A | * | 8/1991 | Barzilali et al. ............ 370/94.1 |
| 5,241,682 A | * | 8/1993 | Bryant et al. ................ 395/800 |
| 5,303,238 A | * | 4/1994 | Brodd et al. ................ 370/94.1 |

FOREIGN PATENT DOCUMENTS

| EP | 0 550 197 A3 | 7/1993 | ............ G06F/9/46 |
| JP | 62135037 | 6/1987 | |
| JP | 62154133 | 7/1987 | |
| JP | 04162155 | 6/1992 | |

OTHER PUBLICATIONS

IBM Systems Journal, Jun. 1992 V31 n2 P161 (28) "Evolution of an Open Communications Architecture".*

* cited by examiner

Primary Examiner—Mark H. Rinehart
Assistant Examiner—Jason Cardone
(74) Attorney, Agent, or Firm—Bracewell & Patterson

(57) ABSTRACT

A method and apparatus for efficient multimedia data interchange which utilizes multimedia pacing in a distributed data processing system. During a multimedia communications session, each of a plurality of receiving stations transmits multimedia pacing requests to a sending station at negotiated set time intervals. The multimedia pacing request includes information on the availability of current storage for multimedia data at the receiving station, a minimum data time remaining in storage in the receiving station and other information pertaining to the interchange of the multimedia data. The sending station then allocates various priorities to the transmission of data to the plurality of receiving stations in an order indicative of the type of data, i.e. multimedia or non-multimedia, and the information in the multimedia pacing request pertaining to the minimum data time remaining in storage at the receiving station. In addition, the sending station periodically determines the availability of the transmission queue. When the transmission queue is not readily available, the sending station transfers only high priority multimedia data to the transmission queue; however when the transmission queue is available, the sending station transfers lower priority multimedia data to the transmission queue as well. The sending station can then supply a plurality of receiving stations with significant multimedia data in advance when the communications interface is not overloaded.

6 Claims, 8 Drawing Sheets

METHOD AND APPARATUS FOR MULTIMEDIA DATA INTERCHANGE WITH PACING CAPABILITY IN A DISTRIBUTED DATA PROCESSING SYSTEM

BACKGROUND OF THE INVENTION

1. Technical Field

The present invention relates in general to improved methods for interchanging data within a distributed data processing system and in particular to improved methods for interchanging multimedia and non-multimedia data within a distributed data processing system.

2. Description of the Related Art

The interchange of data within a distributed data processing system is a well known feature of modern state-of-the-art computer systems. Text and graphics may be efficiently interchanged between data processing facilities utilizing well known modem devices or facsimile devices/cards.

Recently, modern computer systems have begun to experiment in so-called "multimedia" data. That is, presentations containing audio, video, text, graphics and image combined into a common presentation. One problem encountered in the interchange of such multimedia data in a distributed data processing system is the communications interface. The communications interface is frequently the performance constraint in computer systems which support multimedia sources with multiple communications sessions. Several types of communications interfaces which may be utilized in a distributed data processing system include: Local Area Networks (LAN), Wide Area Networks (WAN), and System Bus. Examples of each type of communications interface are listed below.

Local Area Networks (LANs): Token Ring, Ethernet, FDDI, wireless LAN, etc. between the multimedia data sender and the receiving station.

Wide Area Networks (WAN): ISDN, etc. between the multimedia data sender and the receiving station.

System Bus: Multimedia systems store multimedia data on some type of storage, then when a receiving station requests multimedia data, the data is retrieved from the storage and sent across the system bus to some type of communications interface to the receiving station.

Currently, a system which transmits multimedia data to a receiving station across a communications interface sends the data at a preselected rate (bytes or frames per second) based on the type of multimedia data and compression algorithm. This approach, called isochronous transmission, will allocate predictable multimedia data transmission rates for each multimedia session. The receiving station in such an approach assumes the multimedia data arrives at the same rate at which it should be presented to the user at the receiving station.

For example, if a receiving station and a remote sending station choose to communicate with each other across a communications interface, the receiving station and the remote sending station negotiate a set amount of bandwidth for that connection. A dedicated timeslot, such as every 30th of a second, is reserved for the transmission, and no other data may be transmitted in that timeslot. A problem arises with isochronous transmission of multimedia data. Isochronous transmission requires specific hardware which increases the cost of the system. In addition, isochronous transmission may not function as well for general purpose computing. It is therefore apparent a need exists for a method of interchanging multimedia data across any type of communications interface without the need of special hardware.

Another problem encountered within a communications interface is the possible overrun of data transmission to the receiving station. To prevent the overrun of data transmission, a technique called "pacing" controls the transmission of data by a sending station. For example, printers receiving print jobs or a receiving station downloading file transfers from a sending station may utilize pacing to prevent overrun. Sophisticated pacing techniques exist for the transmission of non-multimedia data, such as adaptive pacing, which allows a receiving station to change or adapt the pacing window size based on its buffer resources and traffic patterns in the network. However, in the transmission of multimedia data, no pacing exists.

Fixed pacing consists of the sending station and the receiving station negotiating, before the interchange of the data, a fixed window size for the data which remains constant during the duration of the interchange of multimedia data. A pacing response during the interchange signifies the readiness of the receiving station to receive a window size of multimedia data. The sending station receives the pacing response from the receiving station, immediately transfers a fixed window size of the information to the transmission queue of the sending station, waits until receiving the next pacing response from the receiving station, and then transfers another fixed window size of information to the transmission queue.

The transfer of information to the transmission queue of a sending station has a profound effect on the efficiency of the communications interface. The transmission queue of the sending station lists the items of multimedia or non-multimedia data to be transmitted from the sending station to a plurality of receiving stations. The transmission queue transmits the listed items on a first come, first served basis. The transmission queue is a limited storage buffer and when storage is unavailable, a transfer of data to the transmission queue must wait for more storage to become available. The availability of storage within the transmission queue differs over time, resulting in peaks and valleys in the information flow rate through the transmission queue. Long peaks in the information flow rate can lead to overloading and instability of the communications interface. This problem, the control of the peaks and valleys in the information flow rate, is especially acute when multimedia data interchange, along with non-multimedia data interchange, occurs across the communications interface since multimedia data consumes a large portion of the bandwidth.

SUMMARY OF THE INVENTION

It is therefore one object of the present invention to provide an improved method and apparatus for interchanging data within a distributed data processing system.

It is another object of the present invention to provide an improved method and apparatus for interchanging multimedia and non-multimedia data within a distributed data processing system.

It is yet another object of the present invention to provide an improved method and apparatus for multimedia and non-multimedia data interchange with multimedia pacing capability in a distributed data processing system.

The foregoing objects are achieved as is now described. The efficiency of the communications interface is improved by taking advantage of the large amount of storage available in a typical multimedia receiving station and by utilizing an intelligent multimedia pacing capability. When a multimedia data communications session begins between a sending station and one of a plurality of receiving stations which support multimedia pacing capability, the receiving station and the sending station negotiate on pacing parameters to be utilized during the multimedia data communications session. During the multimedia data communications session, the receiving station transmits multimedia pacing requests to the sending station at negotiated set time intervals. The multimedia pacing request includes information on the availability of current storage for multimedia data in the receiving station, the minimum data time remaining in storage in the receiving station, a parameter to synchronize the interchange of the multimedia data between the receiving system and the sending system and other information pertaining to the interchange of the multimedia data. The sending station then allocates various priorities to the transmission of data to the plurality of receiving stations in an order indicative of the type of data, i.e. multimedia or non-multimedia, and the information in the multimedia pacing request pertaining to the minimum data time remaining in storage at the receiving station.

When the receiving station has only a small amount of multimedia time remaining in storage, the sending station allocates a high priority to the transmission of more multimedia data to that receiving station. When a receiving station has a sufficiently large amount of multimedia time remaining in storage, the sending station allocates a low priority to the transmission of more multimedia data to that receiving station. In addition, the sending station periodically determines the availability of the transmission queue for output data. When the transmission queue is not readily available, the sending station transfers only high priority data to the transmission queue. However, when the transmission queue is available, the sending station transfers lower priority data to the transmission queue as well. The sending station can then supply a plurality of receiving stations with significant multimedia data in advance of actual requirements when the communications interface is not overloaded. Thus, the multimedia pacing method of the present invention flattens the peaks and valleys of the information flow rate through the transmission queue, increasing the total throughput of the communication interface. In addition, any type of communications interface can support the multimedia pacing capability utilizing asynchronous transmission rather than isochronous transmission, which requires special hardware.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
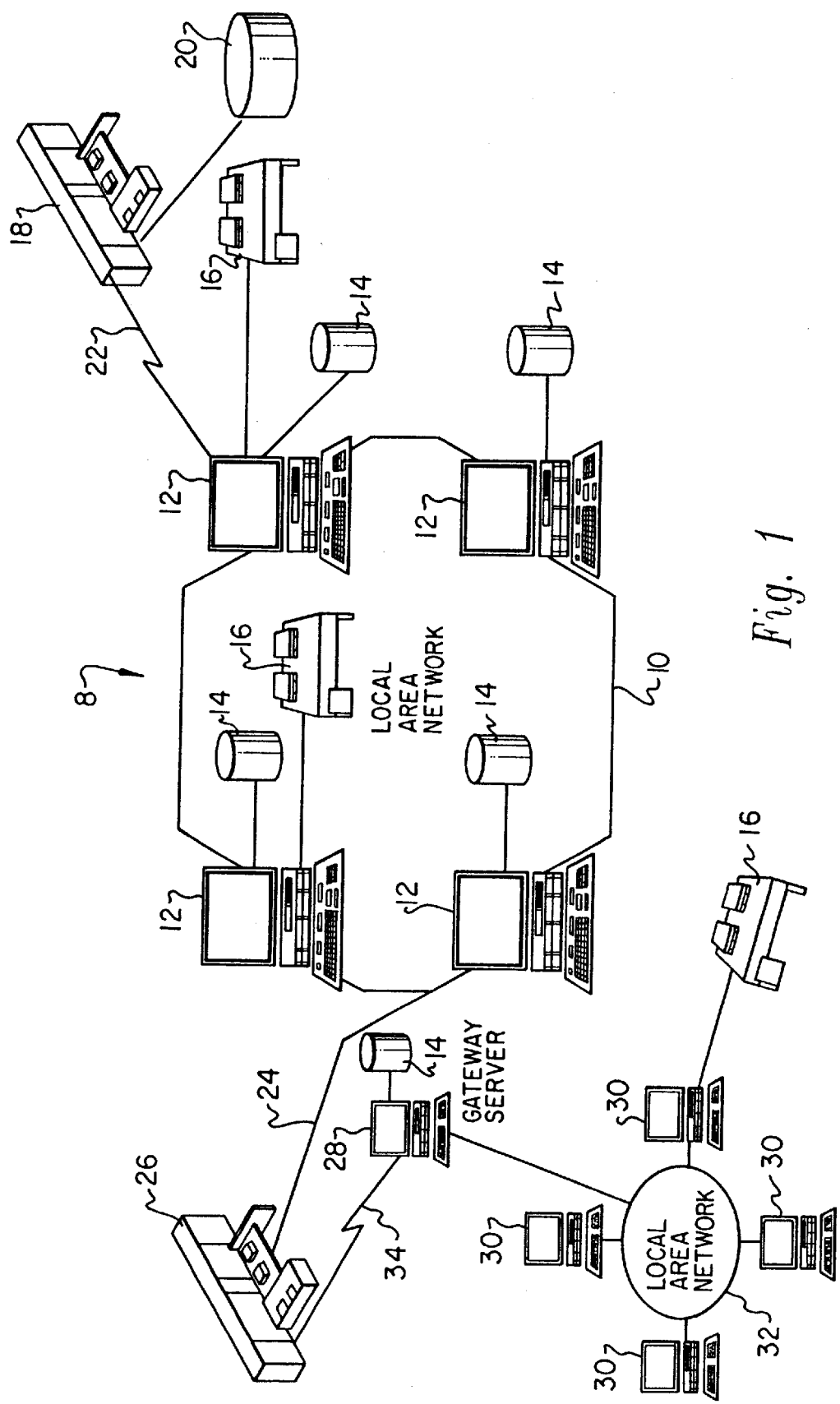
FIG. 1 is a pictorial representation of a distributed data processing system which may be utilized to implement the method and apparatus of the present invention.

With reference now to the figures and in particular with reference to FIG. 1, there is depicted a pictorial representation of a distributed data processing network 8 which may be utilized in accordance with the method and system of the present invention. As may be seen, distributed data processing network 8 may include a plurality of networks, such as Local Area network (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store the various files containing multimedia or non-multimedia data which may be periodically accessed, processed and interchanged by a user within distributed data processing network 8 in accordance with the method of the present invention. In a manner well known in the prior art, each file containing multimedia or non-multimedia data may be stored within a storage device 14 which is associated with a Resource Manager or Library Service, which is responsible for maintaining and updating all files associated therewith.

Still referring to FIG. 1, it may be seen that distributed data processing network 8 also includes multiple central computer systems, such as central computer system 18, which may be preferably coupled to Local Area Network (LAN) 10 by means of communications link 22. In one embodiment of the present invention, central computer system 18 may be an IBM Application System/400, although other computer systems, such as an IBM/System/ 370 or PS/2 could also be utilized. In addition, central computer system 18 may not be necessary if one or more Local Area Networks (LANs) are sufficient to connect all desired users.

Central computer system 18 may also be coupled to a storage device 20 which may also serve as remote storage for Local Area Network (LAN) 10. Similarly, Local Area Network (LAN) 10 may be coupled via communications link 24 through a subsystem control unit/communications controller 26 and communications link 34 to gateway server 28. Gateway server 28 is preferably an individual computer or Intelligent Work Station (IWS) which serves to link Local Area Network (LAN) 32 to Local Area Network (LAN) 10 such that multimedia and non-multimedia data may be easily transmitted and received between individuals within either network containing multimedia data in accordance with the method of the present invention. Gateway server 28, in one preferred embodiment of the present invention, may be an IBM Application System/400.

As discussed above with respect to Local Area Network (LAN) 32 and Local Area Network (LAN) 10, a plurality of files may be stored within storage device 20 and controlled by central computer system 18, as Resource Manager or Library Service for the files thus stored. Of course, those skilled in the art will appreciate that central computer system 18 may be located a great geographical distance from Local Area Network (LAN) 10 and similarly, Local Area Network (LAN) 10 may be located a substantial distance form Local Area Network (LAN) 32. That is, Local Area Network (LAN) 32 may be located in California, while Local Area Network (LAN) 10 may be located in Texas and central computer system 18 may be located in New York.

As will be appreciated upon reference to the foregoing, it is often desirable for users within one portion of distributed data processing network 8 to be able to transmit multimedia and non-multimedia data to other users within distributed data processing network 8. The method and apparatus of this invention may be utilized to transmit multimedia data and non-multimedia data a between one portion of distributed data processing network 8 to other users within distributed data processing network 8 across any type of communications interface. The transmission may occur between two local area networks such as Local Area Network (LAN) 10 and Local Area Network (LAN) 32 across Gateway Server 28. The transmission may also occur across a communications interface between a Local Area Network (LAN) and a Wide Area Network (WAN), such as ISDN, or across a communications interface between two Wide Area Networks (WANs).

The method and apparatus of the present invention may also be utilized to transmit multimedia data and non-multimedia data between individual stations such as 12 and 30 within a Local Area Network (LAN) across a communications interface, such as central computer 18. In addition, multiple communication interfaces could be involved in the transmission of multimedia and non-multimedia data. The second (or third, or fourth, etc.) communications interface then acts as the receiving station to the sending station or the prior communications interface when multimedia data is transmitted in accordance with the present invention. Thus, the distributed data processing network 8 illustrates only one example of the many possible communications interfaces which may be utilized with the method and apparatus of the present invention.

The transmission of multimedia data is generally accomplished in the prior art by isochronous transmission of the multimedia data. If pacing of data is utilized, a fixed window size of information is transmitted by the sending station upon receipt of a pacing response, regardless of the load across the communications interface. It should be apparent that a need exists for a method whereby multimedia data may be interchanged efficiently with a more intelligent pacing capability across any communications interface within a distributed data processing network such as distributed data processing network 8.

Figure 2:
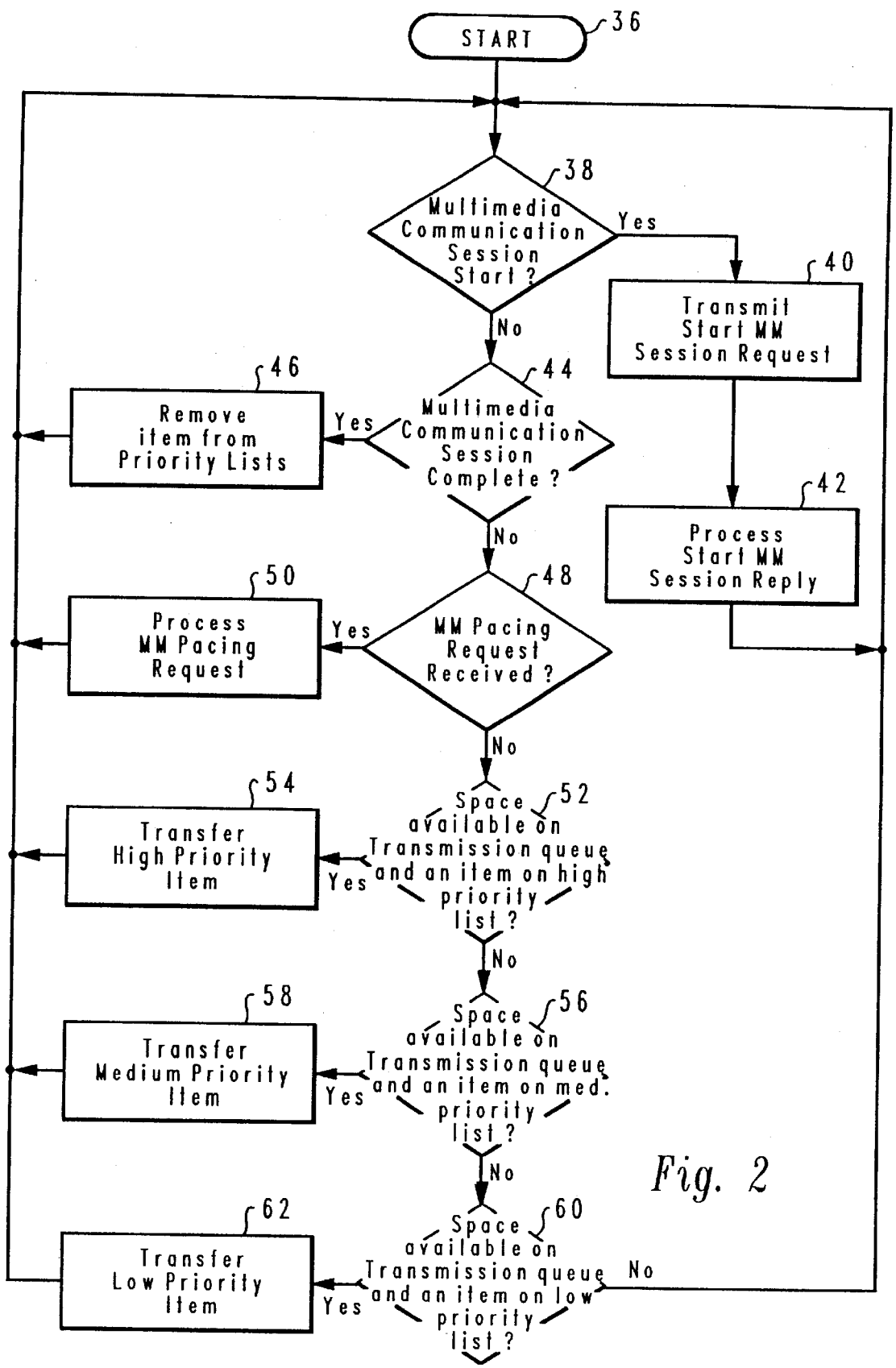
FIG. 2 is a high level logic flow chart which illustrates the transmission of multimedia and non-multimedia data in an order indicative of the availability of the transmission queue and the priority of the data in accordance with the method and apparatus of the present invention.
Figure 4:
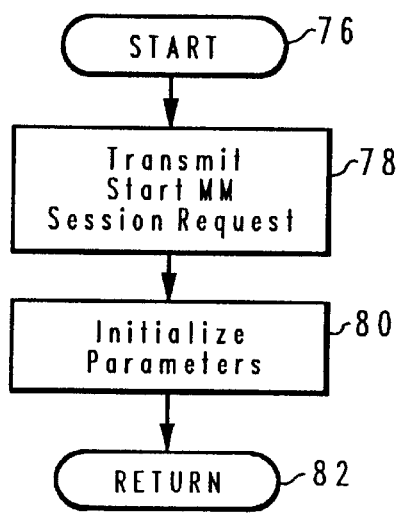
FIG. 4 is a high level logic flow chart which illustrates the transmission of a start multimedia session request from the sending system in accordance with the method and apparatus of the present invention.

Referring now to FIG. 2, a high level flow chart is illustrated which depicts the transfer by a sending station of multimedia and non-multimedia data to a transmission queue in an order indicative of a priority associated with the data and the availability of the transmission queue, in accordance with the method and apparatus of the present invention. The process begins at block 36 and thereafter passes to block 38 which illustrates a determination of whether or not a multimedia communications session is to start. The determination to start a multimedia data communications session can be initiated by the sending station or by a message from one of a plurality of receiving stations. If a determination is made to start a multimedia communications session, block 40 depicts the transmitting of a start multimedia session request to one of a plurality of receiving stations from the sending station. FIG. 4 illustrates in more detail the transmission of the start multimedia session request from the sending station. The present process then passes to block 42 which illustrates the processing of the start multimedia session reply sent from a receiving station, in response to the start multimedia session request. The processing of the start multimedia session reply is depicted in more detail in FIG. 5. The process then returns to block 38 which depicts again a determination whether or not a multimedia communications session is to start.

In the event a multimedia communication session is not to start, as determined within block 38, the process passes to block 44. Block 44 illustrates a determination whether or not a multimedia communications session is complete. If a multimedia communications session is complete, the process passes to block 46 which depicts the removal of the data being interchanged within the completed multimedia communications session from the list of priorities to be transferred to the transmission queue. The process then returns to block 38. Referring again to block 44, in the event a multimedia communications session is not complete, the process passes to block 48. Block 48 illustrates a determination of whether or not a multimedia pacing request has been received from one of a plurality of receiving stations. If a multimedia pacing request has been received, the process passes to block 50 which depicts the processing of the multimedia pacing request. The discussion accompanying FIG. 6 describes the processing of the multimedia pacing request in greater detail. The process then returns to block 38.

Referring again to block 48, if a multimedia pacing request has not been received from a receiving station, the process passes to block 52. Block 52 illustrates the determination of whether or not space is available within the transmission queue and whether or not data is allocated as high priority multimedia data. Allocation of a data item as high priority can be accomplished by attaching a flag to the data item to designate it as such, or as in the preferred embodiment described herein, a data item is allocated as high priority by placing the data item, or its address, as an item on a high priority list. Similarly, a data item is allocated as medium priority or low priority by placing the data item, or its address, as an item on a medium priority list or a low priority list, respectively.

Still referring to block 52, if space is available on the transmission queue and an item is allocated to the high priority multimedia data list, the process passes to block 54. Block 54 depicts the transfer of the high priority multimedia data item to the transmission queue. A more detailed description of the transfer of high priority multimedia data item is described with respect FIG. 7. The process then returns to block 38. Referring again to block 52, in the event space is not available on the transmission queue or an item is not allocated to the high priority multimedia data list, the process passes to block 56. Block 56 illustrates the determination whether a data item is on the medium priority data list and whether space is available on the transmission queue. Non-multimedia data is always allocated to the medium priority data list while multimedia data is never allocated to the medium priority data list in the depicted embodiment of the present invention. If a data item is on the medium priority data list and space is available on the transmission queue, the process passes to block 58 which depicts the transfer of the medium priority data item to the transmission queue. The process then returns to block 38.

Referring again to block 56, in the event a data item is not on the medium priority data list or space is not available on the transmission queue, the process passes to block 60. Block 60 illustrates the determination of whether space is available on the transmission queue and whether a data item is on the low priority multimedia data list. If space is available on the transmission queue and a data item is on the low priority multimedia data list, the process passes to block 62, which depicts the transfer of the low priority data to the transmission queue. A more detailed discussion of the transfer of the low priority data to the transmission queue accompanies FIG. 8. Depending upon the implementation of the process, it may be appropriate to maintain a constant value for the availability of the transmission queue between the determinations illustrated in block 52 and block 60. For example, the availability of the transmission queue may be a set variable established at block 52. A constant value for the availability of the transmission queue ensures low priority data will not be sent before high priority data if the real time availability of the transmission queue changes between the determination illustrated in block 52 and block 60. After the transmission of low priority data to the transmission queue, the process again returns to block 38.

Referring again to block 60, if space is not available on the transmission queue or a data item is not on the low priority multimedia data list, the process returns to block 38. Although only three priority lists, a high priority multimedia data list, a medium priority list, and a low priority multimedia data list, are illustrated in the high level logic flow chart of FIG. 2, a person with skill in the art will appreciate that any number of priorities may be created and added to the list of priorities upon reference to this disclosure.

Figure 3:
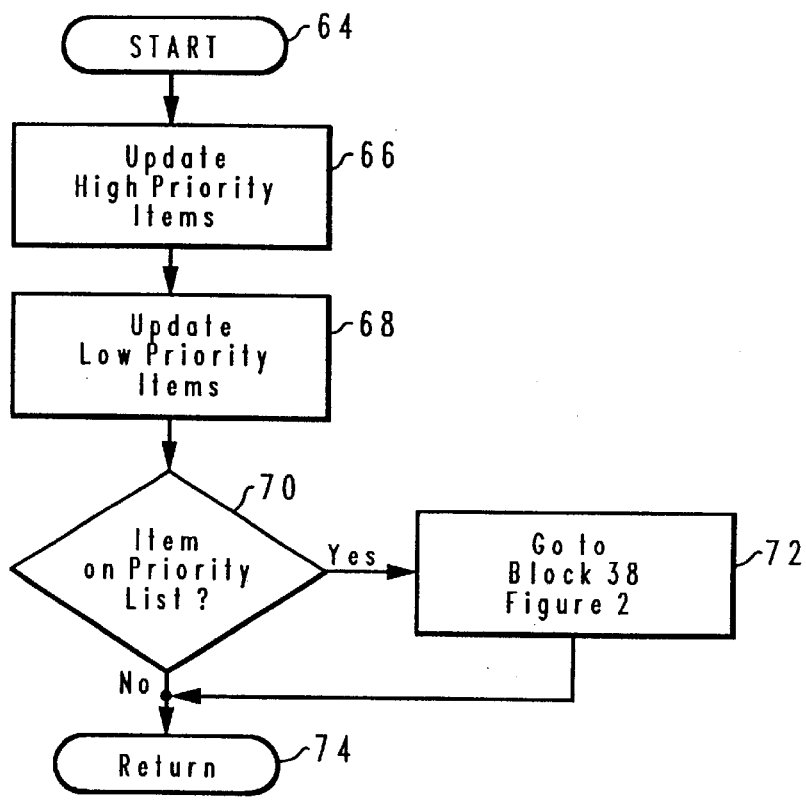
FIG. 3 is a high level logic flow chart which depicts the periodic allocation of priorities to multimedia data by the sending station at set time intervals in accordance with the method and apparatus of the present invention.

With reference now to FIG. 3, a high level flow chart depicts the allocation of priorities to multimedia data items by the sending station at set time intervals in accordance with the method and apparatus of the present invention. An internal clock in the sending station initiates the illustrated process at the set time intervals. The process starts at block 64 and thereafter passes to block 66. Block 66 illustrates the process of updating the multimedia data items on the high priority data list. For each item on the high priority data list, the set time interval is subtracted from the multimedia data time remaining at the receiving station, and the updated multimedia data time remaining at the receiving station is stored. The multimedia data time remaining at the receiving station is also updated upon receipt, from a receiving station, of a multimedia pacing request as described with respect to FIG. 6. By updating the multimedia data time remaining at the receiving station in these two ways, the sending station maintains an accurate estimate of the multimedia data time remaining at each receiving station for each multimedia data item allocated to the high priority list.

Next, the process passes to block 68 which depicts the process of updating the items on the low priority data list. For each item on the low priority data list, the set time interval is subtracted from the multimedia data time remaining at the receiving station and the updated multimedia data time remaining is stored. Again, the multimedia data time remaining at a receiving station is also updated upon receipt of a multimedia pacing request received from the receiving station as described herein with respect to FIG. 6. In addition, if the updated multimedia data time remaining for a selected data item is less than a predetermined threshold, the low priority data item is re-allocated to the high priority data list. The process then passes to block 70 which illustrates a determination whether a data item is on a priority data list. If a data item is on a priority data list, the process returns to block 38 of FIG. 2, as depicted by block 72. By returning to block 38 of FIG. 2, the process ensures that a data item on a priority list will be transmitted as quickly as possible. If a data item is not on a priority data list, the process passes to block 74. Again this high level flow chart depicts the updating of the priority list at set time intervals, ensuring an accurate estimate of the minimum data time remaining at each receiving station. The medium priority list contains non-multimedia data items and thus is not updated in this embodiment of the invention.

Referring now to FIG. 4, a high level logic flow chart is illustrated which depicts the transmission of a start multimedia session request by a sending station in accordance with the method and apparatus of the present invention. The process begins at block 76 and then passes to block 78 which illustrates a sending station transmitting a start multimedia session request to one of a plurality of receiving stations. The start multimedia session request includes the following parameters: a parameter to indicate support of multimedia pacing, a parameter to indicate a set time interval between pacing requests, a parameter to synchronize the interchange of multimedia data, a parameter to indicate the transmission frame, and a parameter to indicate the minimum data time remaining at the receiving station. For a more detailed description of these parameters, see the discussion accompanying FIG. 9 herein. The process then passes to block 80 which depicts the sending station initializing the parameters for the communication. The process then returns, as illustrated at block 82.

Figure 5:
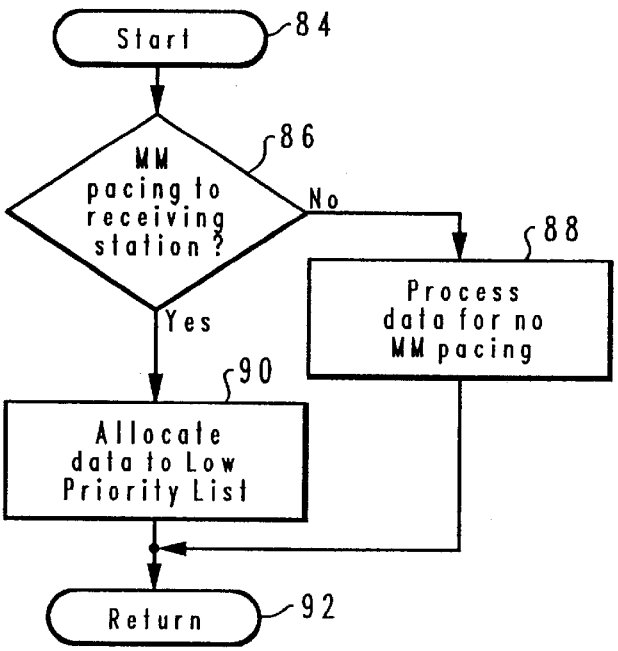
FIG. 5 is a high level logic flow chart which depicts the processing by the sending station of a start multimedia session reply in accordance with the method and apparatus of the present invention.

With reference now to FIG. 5, a high level logic flow chart is depicted which illustrates the processing by a sending station of a start multimedia session reply transmitted by one of a plurality of receiving stations in accordance with the present invention. The process begins at block 84 and thereafter, passes to block 86 which depicts a determination whether or not multimedia pacing will be utilized in that multimedia communications session with the receiving station. If multimedia pacing will not be utilized, the process passes to block 88 which illustrates processing the data to be transmitted without multimedia pacing. Such processing includes allocating non-multimedia data as a data item on a medium priority list and allocating multimedia data to be transmitted without multimedia pacing capability.

If multimedia pacing is utilized, the process passes to block 90 which allocates the multimedia data as a data item to a low priority data list. As will be described with respect to FIG. 6, when the sending station processes a multimedia pacing request from the receiving station, the minimum data time remaining at the receiving station is updated. Since initially no minimum data time is remaining, the data item will be reallocated to a high priority data list when the first pacing request is processed by the sending station. After the creation of an entry for the data item on a low priority data list, the process returns as illustrated at block 92.

Figure 6:
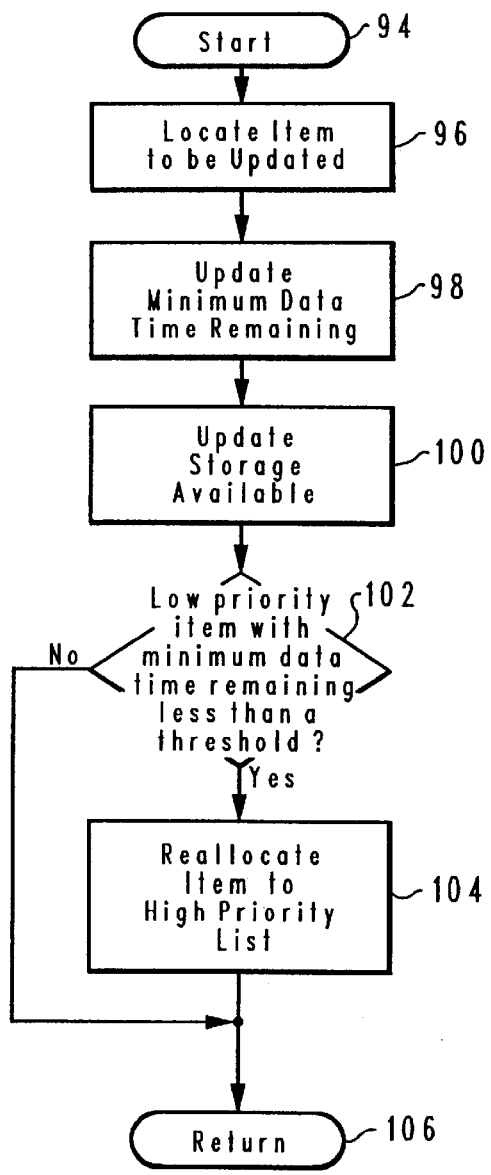
FIG. 6 is a high level logic flow chart which illustrates the processing of a multimedia pacing request by the sending station in accordance with the method and apparatus of the present invention.

With reference now to FIG. 6, a high level logic flow chart is illustrated which depicts the processing of a multimedia pacing request by the sending station. The process begins at block 94 and thereafter passes to block 96 which illustrates location of the appropriate item for the particular multimedia session on the priority data lists by the sending station. The process then passes to block 98 which depicts the updating of a parameter to indicate the minimum data time remaining for the data item. The process when passes to block 100 which illustrates the updating of a parameter to indicate the availability of current storage for multimedia data at the receiving station. A value for the storage available at the receiving station may be calculated by subtracting the number of the last frame sent by the sending station from the last frame received by the receiving station, as communicated in the multimedia pacing request. (The last frame received by the receiving station as communicated in the multimedia pacing request may also serve as a synchronization parameter as will be discussed in the following description of FIG. 9.) This difference, multiplied by the transmission frame size and subtracted from the value of the availability of current storage in the multimedia pacing request, results in a value for the present storage available. This calculation accounts for any transmission frames which were transmitted from the sending station but received by the receiving station after the receiving station transmitted the multimedia pacing request.

The process then passes to block 102 which depicts a determination of whether or not the data item is a low priority item and has a minimum data time remaining less than a predetermined threshold. If it is a low priority item with a minimum data time remaining which is less than a predetermined threshold, block 104 illustrates allocating the data item to a high priority data list. In situations in which the multimedia application at the receiving station expects user interaction which alters the multimedia session data, the corresponding predetermined threshold should be small. However, when the multimedia application at the receiving station expects no or little change in the multimedia session data, the predetermined threshold may be much greater. After reallocating a data item to a high priority data list, the process passes to block 106. Referring again to block 102, if a data item is not a low priority item with a minimum data time remaining which is less than a predetermined threshold, the process returns, as illustrated at block 106.

Figure 7:
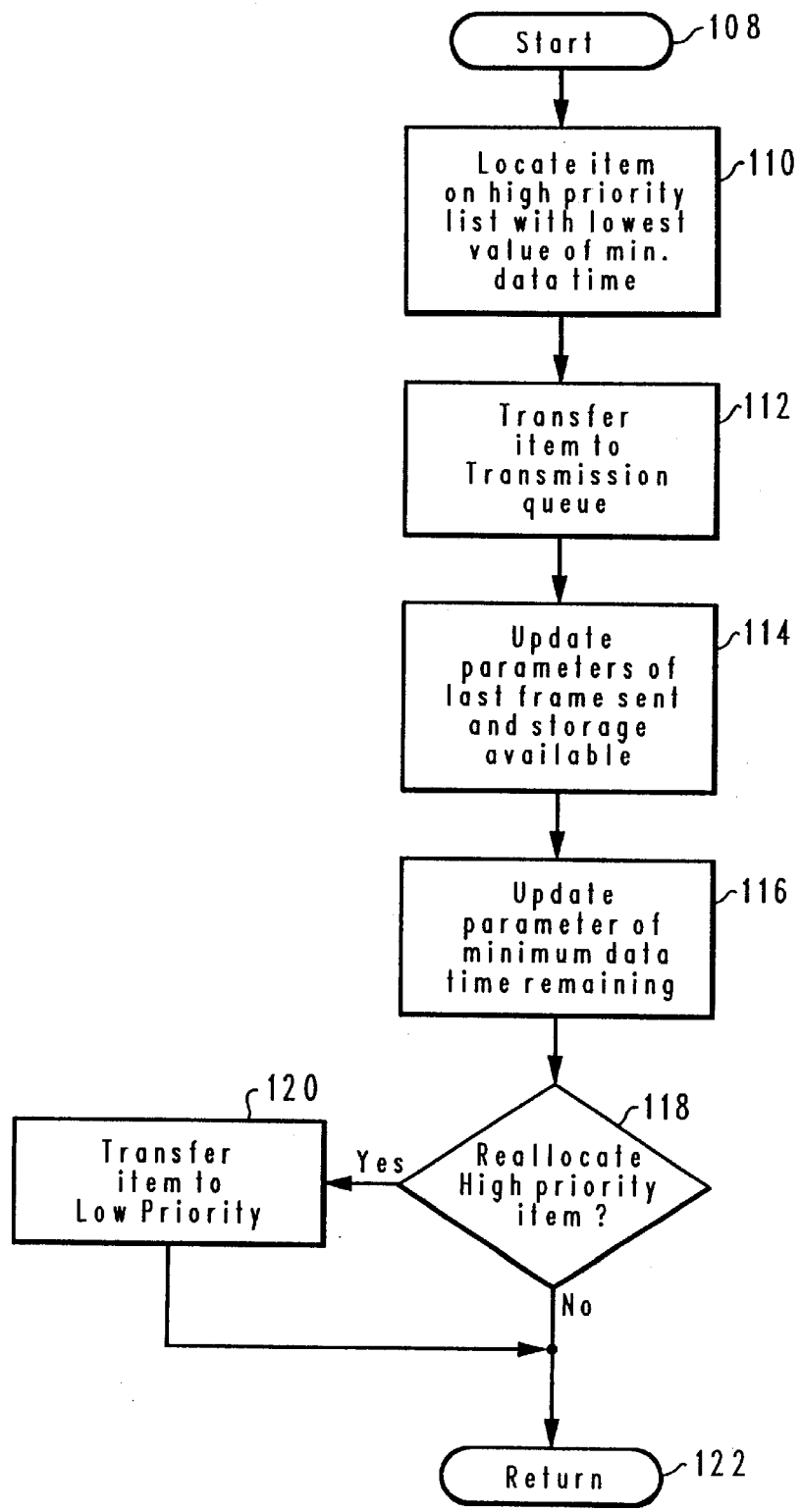
FIG. 7 is a high level logic flow chart which depicts the transfer of a high priority item to a transmission queue by the sending station in accordance with the method and apparatus of the present invention.

With reference now to FIG. 7, a high level logic flow chart is depicted which illustrates the transfer of a data item allocated to a high priority data list to a transmission queue by the sending station. The process begins at block 108 and thereafter passes to block 110, which depicts locating the data item on a high priority list which has the lowest value of minimum data time remaining at the receiving station. The process then passes to block 112, which illustrates transferring a transmission frame size of the located item, or its address, to the transmission queue. Of course, multiple frames may be transmitted as a group. The transmission queue then transmits the data from the sending station. The process next passes to block 114, which depicts updating the parameters to indicate the last frame sent and indicate current availability of storage at the receiving station and also has storage space available. The process then passes to block 116 which illustrates updating the minimum data time remaining for the transferred data item to account for the data transmitted.

The process then passes to block 118 which depicts a determination whether or not the minimum data time remaining for the transferred item is now above a predetermined threshold, such that the data item should be reallocated to a low priority list. If the data item should be reallocated to a low priority list, the process passes to block 120 which illustrates reallocating the data item, and then, the process returns, as illustrated at block 122. Referring again to block 118, if the data item is not reallocated to a low priority list, the process passes directly to block 122 and returns.

Figure 8:
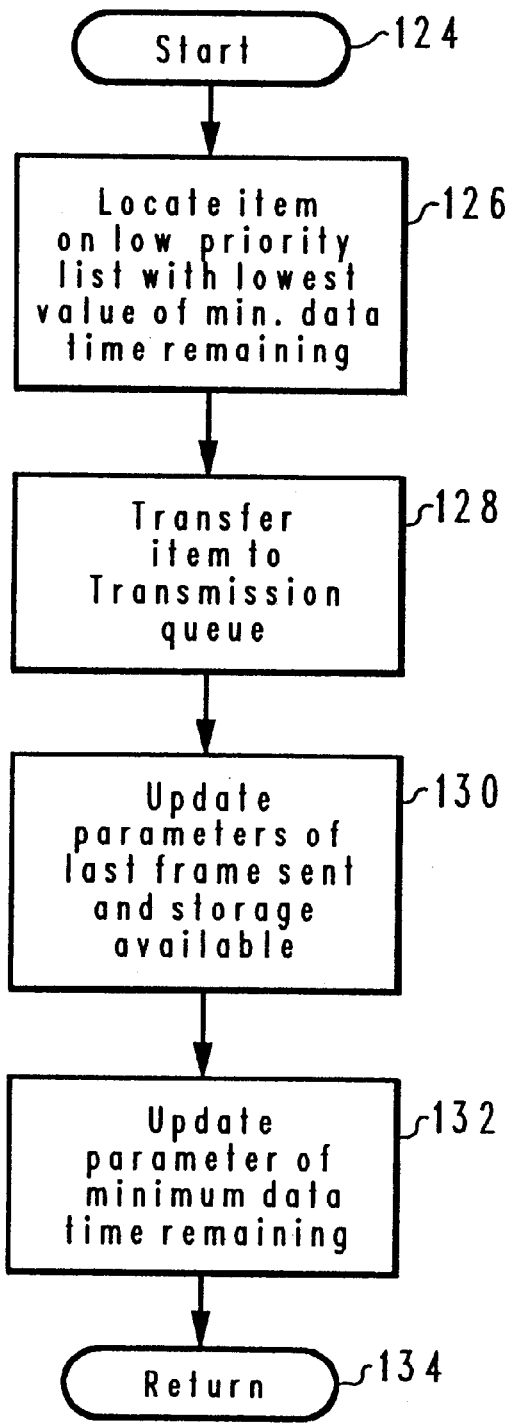
FIG. 8 is a high level logic flow chart which illustrates the transfer of a low priority item to a transmission queue by the sending station in accordance with the method and apparatus of the present invention.

With reference to FIG. 8, a high level logic flow chart is illustrated which depicts the transfer of a data item on a low priority data list to a transmission queue by the sending station. The process begins at block 124 and thereafter passes to block 126 which depicts locating the data item on a low priority list which has the lowest value of minimum data time remaining at the receiving station. The process passes to block 128 which illustrates transferring a transmission frame size of the located data item, or its address, to the transmission queue. The transmission queue then transmits the data from the sending station. The process passes to block 130 which depicts updating the parameter to indicate the last frame sent and updating the parameter to indicate the availability of current storage at the receiving station. The process then passes to block 132 which illustrates updating the minimum data time remaining for the data item to account for the data transmitted. The process then returns, as illustrated at block 134.

Figure 9:
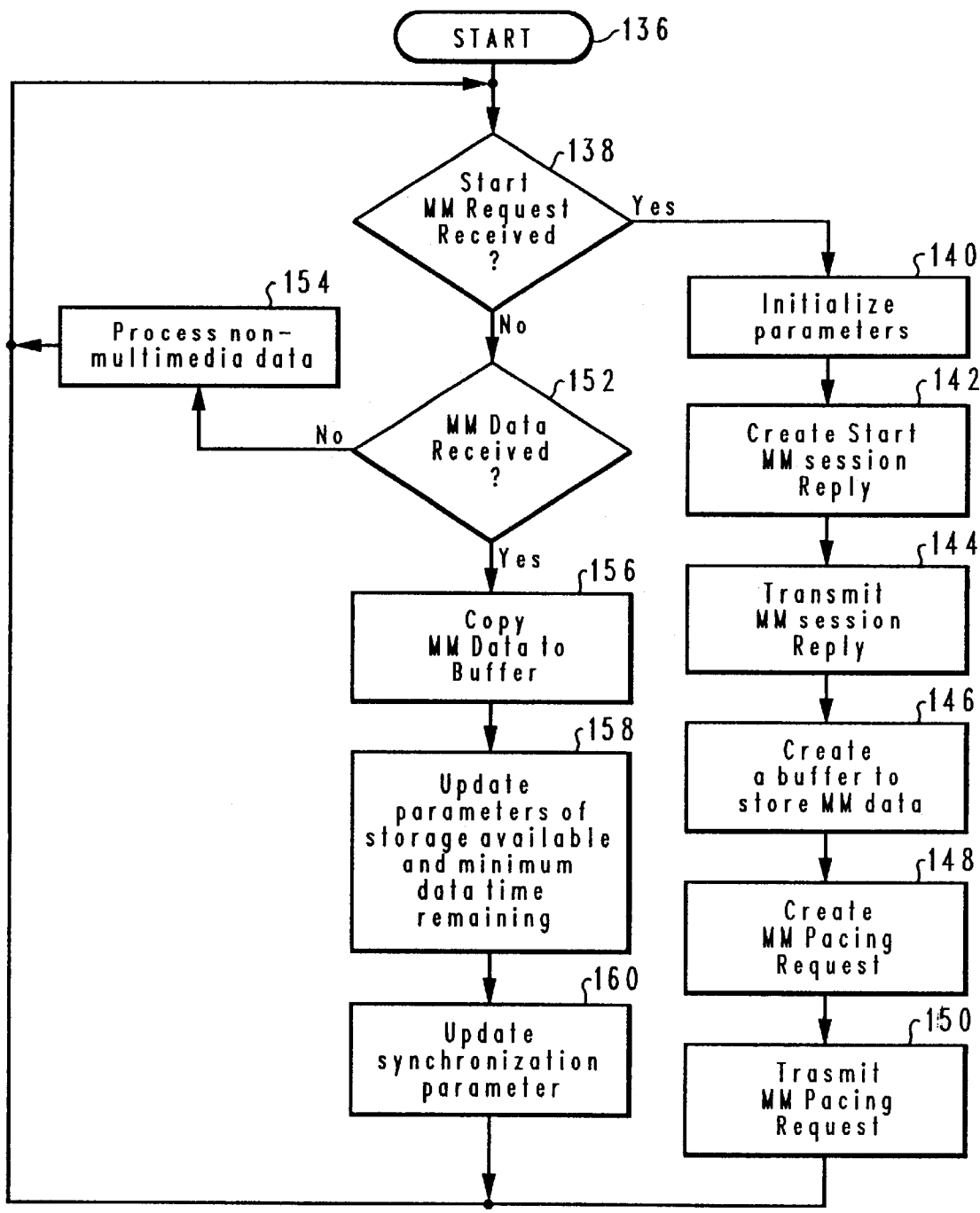
FIG. 9 is a high level logic flow chart which depicts the response to a start multimedia session request by one of a plurality of receiving stations in accordance with the method and apparatus of the present invention.

With reference to FIG. 9, a high level logic flow chart is depicted which illustrates the response to a start multimedia session request by one of a plurality of receiving stations. The process begins at block 136 and thereafter passes to block 138, which depicts a determination whether or not a start multimedia session request has been received. If a start multimedia session request has been received, the process passes to block 140 which illustrates the initializing of parameters utilized during the multimedia communications interface. The parameters include the following: a parameter to indicate the set time interval selected for the transmission of multimedia pacing requests, a parameter to indicate the frame size of the multimedia information, a parameter to synchronize the interchange of the multimedia data, a parameter to indicate the transmission frame, a parameter to indicate availability of current storage and a parameter to indicate the minimum data time remaining in the receiving station. The parameter to synchronize the interchange of the multimedia data between the receiving station and the sending station ensures the sending station correctly transmits the next proper transmission frame. In the depicted embodiment, the synchronization parameter is the last frame number received by the receiving station, permitting the sending station to also utilize the synchronization parameter to compute the availability of current storage at the receiving station, as described with respect to block 100 of FIG. 6.

The parameter which indicates the transmission frame specifies the number of frames of data to be transmitted in any one particular transmission. The parameter that indicates the availability of current storage specifies the unused storage allocated in a fixed buffer which stores the multimedia data. The fixed buffer is described in more detail below. The parameter which indicates the minimum data time remaining in the receiving station is a value for the minimum time the receiving station has until it exhausts the multimedia data in the fixed buffer.

After the initializing of the parameters as illustrated by block 140, the process passes to block 142 which depicts the creation of a start multimedia session reply by the receiving station. The start multimedia session reply includes a parameter to indicate multimedia pacing capability and such other parameters pertaining to the transmission of the multimedia data, as described above. For example, the parameter which indicates the frame size may be adjusted, if necessary, and included in the start multimedia session reply. The process then passes to block 144 which illustrates the transmission of the start multimedia session reply from the receiving station.

Next, block 146 depicts the creation of a fixed buffer to be utilized to store the multimedia data during a multimedia communications session. The process then passes to block 148 which illustrates the creation of a multimedia pacing request by the receiving station. The multimedia pacing request includes one or more of the following parameters: a parameter to indicate availability of current storage in the fixed buffer, a parameter to indicate minimum data time remaining, and a parameter to synchronize the interchange of the multimedia data between the receiving station and the sending station. Of course, no minimum data time remaining is present before the transmission of the multimedia data begins. Hence, when the sending station receives the first multimedia pacing request of the multimedia communications session, the sending station will allocate a high priority to the data to be transmitted. The process then passes to block 150 which depicts the transmitting of the multimedia pacing request to the sending station. The process then returns to block 138.

Referring again to block 138, if a start multimedia session request is not received, the process passes to block 152, which illustrates a determination whether or not multimedia data was received. In the event multimedia data was not received, the process passes to block 154 which depicts the processing of non-multimedia data received. The process then returns to block 138. Referring again to block 152, in the event, multimedia data is received, the process passes to block 156 which illustrates storing the multimedia data in the fixed buffer described in association with block 146. The process then passes to block 158 which illustrates the updating of the parameter to indicate the availability of current storage in the fixed buffer and the parameter to indicate the minimum data time remaining. The process then passes to block 160 which depicts the updating of the synchronization parameter by the receiving station. The process then returns to block 138.

Figure 10:
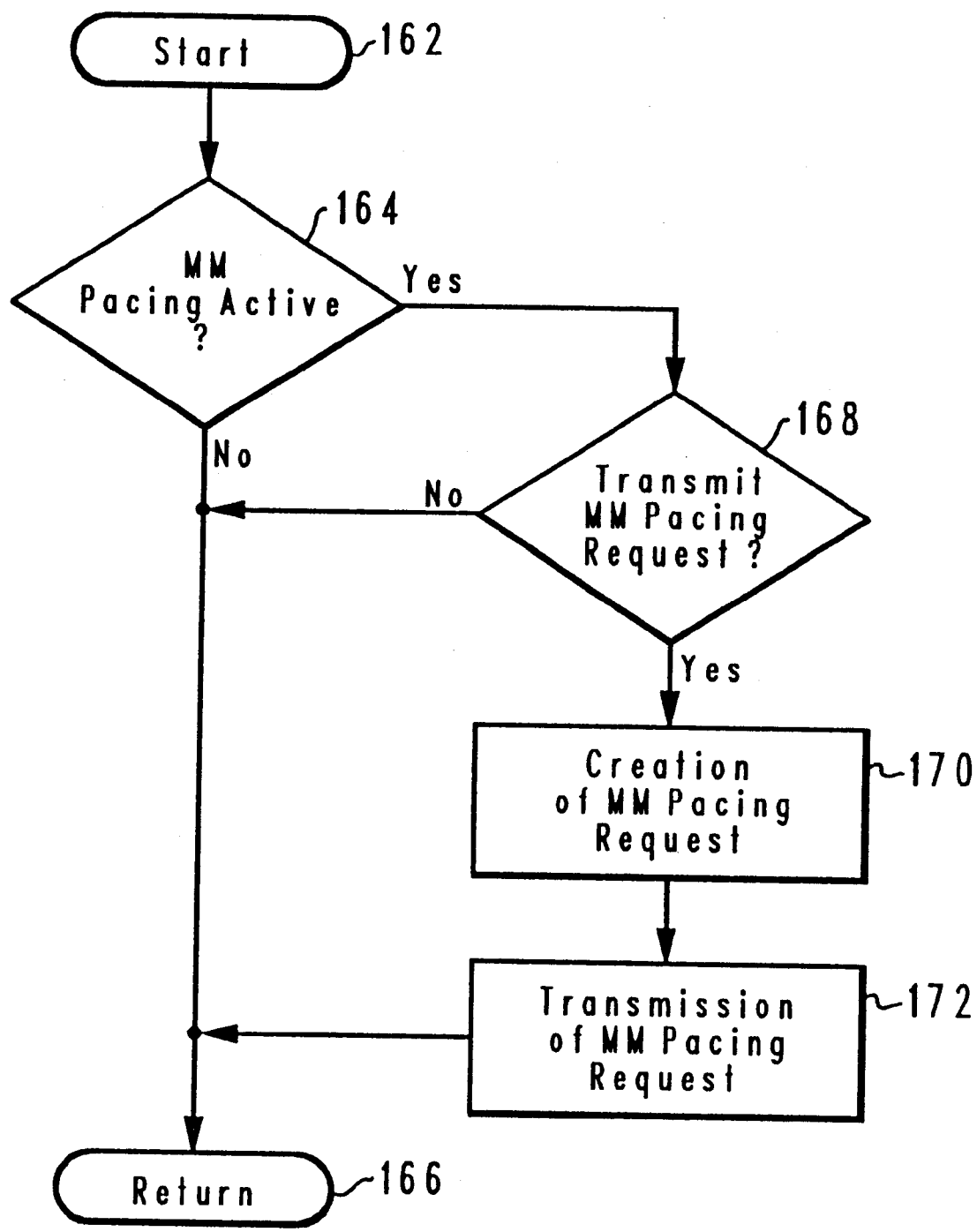
FIG. 10 is a high level logic flow chart which illustrates the periodic transmission of multimedia pacing requests at set time intervals by one of a plurality of receiving stations in accordance with the method and apparatus of the present invention.

With reference now to FIG. 10, a high level logic flow chart depicts the periodic transmission of multimedia pacing requests at set time intervals by one of a plurality of receiving stations. The process begins at block 162 and thereafter passes to block 164 which illustrates a determination of whether or not multimedia pacing is being utilized in the multimedia communications session. If multimedia pacing is not being utilized, the process passes to block 166 and returns. Referring again to block 164, if a multimedia pacing is being utilized, the process passes to block 168 which depicts a determination whether or not it is time to transmit a multimedia pacing request. As described above, a set time interval in which to send a multimedia pacing request was determined before the interchange of data. If it is not yet time to transmit a multimedia pacing request, the process passes to block 166.

Referring again to block 168, if it is time to transmit a multimedia pacing request, the process passes to block 170 which illustrates the creation of a multimedia pacing request. The multimedia pacing request includes one or more of the following parameters: a parameter to indicate availability of current storage in the receiving station, a parameter to indicate minimum data time remaining, and a parameter to synchronize the interchange of multimedia data between the receiving station and the sending station. The process then passes to block 172 which depicts the transmission of the multimedia pacing request. The process then passes to block 166 and returns.

Those skilled in the art will appreciate that the buffer memory allocated within the receiving station may be allocated in a dynamic manner which accommodates various other applications which may be active within the receiving station. For example, the buffer memory necessary within the receiving station may be dynamically reduced by reducing the size of buffer as portions of the multimedia data are presented. Similarly, the buffer size may be dynamically enlarged in response to an increased availability of memory at the receiving station.

By utilizing the above described methods and apparatus of the present invention, the interchange of multimedia data in a distributed data processing system is more efficient and less costly. The present invention decreases the peaks and valleys of the information flow rate through the communications interface by sending data items to receiving stations, before the data is required, when the communications interface is available. Since the communications interface is often the performance constraint in computer systems which support multimedia communications, the present invention not only increases the overall throughput of information but also the overall performance of the communications system. In addition, the present invention requires no extra hardware to implement in a communications interface, and thus, the present invention is less costly than previous methods, which do require special hardware.

While the invention has been particularly shown and described with reference to a preferred embodiment, it will be understood by those skilled in the art that various changes in form and detail may be made therein without departing from the spirit and scope of the invention.

What is claimed is:

1. A method in a distributed data processing system for the interchange of multimedia data and non-multimedia data between a plurality of receiving stations and a sending station, wherein said sending station contains a transmission queue, said method comprising the steps of:

transmitting a multimedia pacing request from one of said plurality of receiving stations to said sending station at selected time intervals, periodically determining an availability of said transmission queue within said sending station, and selectively transferring said multimedia data and said non-multimedia data to said transmission queue in a selected order in response to both said determined availability of said transmission queue and said multimedia pacing requests, wherein said method increases the overall information flow through said transmission queue.

2. The method in a distributed data processing system for the interchange of multimedia data and non-multimedia data between a plurality of receiving stations and a sending station, according to claim 1, further comprising the step of negotiating said selected time interval between said sending station and one of said plurality of receiving stations prior to said interchange of said multimedia data and said non-multimedia data.

3. The method in a distributed data processing system for the interchange of multimedia data and non-multimedia data between a sending station and a plurality of receiving stations according to claim 1, wherein said step of transmitting a multimedia pacing request from one of said plurality of receiving stations to said sending station comprises the step of transmitting a parameter within said multimedia pacing requests which indicates a minimum multimedia data time remaining at one of said plurality of receiving stations.

4. A method in a distributed data processing system for the interchange of multimedia data and non-multimedia data between a plurality of receiving stations and a sending station, wherein said sending station contains a transmission queue, said method comprising:

creating a buffer with a predetermined capacity for storing received multimedia data at one of said plurality of receiving stations;

periodically determining a minimum multimedia data time remaining in said buffer at one of said plurality of receiving stations;

periodically transmitting a multimedia pacing request from said receiving station to said sending station which includes said minimum multimedia data time remaining in said buffer;

determining an availability of said transmission queue at said sending station to output said multimedia data and said non-multimedia data; and transferring said multimedia data and said non-multimedia data to said transmission queue in a selected order in response to both said availability of said transmission queue and said minimum multimedia data time remaining in said buffer.

5. A distributed data processing system for the interchange of multimedia data and non-multimedia data between a plurality of receiving stations and a sending station, wherein said sending station contains a transmission queue, said distributed data processing system comprises:

transmitting means for transmitting a multimedia pacing request from one of said plurality of receiving stations to said sending station at selected time intervals, means for periodically determining an availability of said transmission queue in said sending station, and means for transferring said multimedia data and said non-multimedia data to said transmission queue in a selected order in response to both said determined availability of said transmission queue and said multimedia pacing request, wherein said method increases the overall information flow through said transmission queue.

6. A distributed data processing system for the interchange of multimedia data and non-multimedia data, said distributed data processing system comprises:

a plurality of receiving stations each having a buffer with a predetermined capacity for storing received multimedia data at one of said plurality of receiving stations;

a sending station having a transmission queue for transmitting said multimedia data and said non-multimedia data;

means for determining the minimum multimedia data time remaining in said buffer by each of said plurality of receiving stations;

transmitting means for periodically transmitting a multimedia pacing request transmitted from said receiving station to said sending station, wherein said multimedia pacing request includes said minimum multimedia data time remaining in said buffer;

means for determining an availability of said transmission queue at said sending station to output said multimedia data and said non-multimedia data; and transferring means for transferring said multimedia data and said non-multimedia data to said transmission queue in a selected order in response to both said minimum multimedia data time remaining in said buffer and said availability of said transmission queue.

* * * * *